(12) United States Patent
Iida et al.

(10) Patent No.: US 6,802,503 B2
(45) Date of Patent: Oct. 12, 2004

(54) TRANSPORT MECHANISM OF SORTING MACHINE FOR LARGE THIN OBJECTS

(75) Inventors: Kazuhito Iida, Tokyo (JP); Kenichi Ikegami, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/350,137

(22) Filed: Jan. 24, 2003

(65) Prior Publication Data

US 2003/0141171 A1 Jul. 31, 2003

(30) Foreign Application Priority Data

Jan. 28, 2002 (JP) ........................................ 2002-018766

(51) Int. Cl.[7] ............................................... B07C 3/06
(52) U.S. Cl. ............................... 270/58.29; 270/52.16; 270/52.14; 271/69; 198/839; 198/703
(58) Field of Search .......................... 270/58.29, 52.14, 270/52.16, 52.19, 52.22; 271/69, 299, 178, 179; 198/680, 703, 678.1, 839

(56) References Cited

U.S. PATENT DOCUMENTS

| | | | | |
|---|---|---|---|---|
| 4,706,951 A | * | 11/1987 | Leu | ........................ 270/52.22 |
| 5,050,851 A | * | 9/1991 | Eugster | .................... 270/52.22 |
| 5,667,211 A | * | 9/1997 | Reist | ........................ 270/52.16 |
| 5,921,538 A | * | 7/1999 | Schlough | .................. 270/52.18 |
| 6,227,378 B1 | * | 5/2001 | Jones et al. | ................. 209/698 |

* cited by examiner

*Primary Examiner*—Patrick Mackey
(74) *Attorney, Agent, or Firm*—Sughrue Mion, PLLC

(57) ABSTRACT

In a transport mechanism of a sorting machine for large thin objects, objects to be transported (paper sheets such as postal matter) stored in transport boxes can be made collectable into smaller collection boxes than the transport boxes. The transport boxes storing and transporting the paper sheets given sorting information are attached to a free chain which is supported by the rail that is twisted and always drives, and when it approaches a spot where the rail is twisted, the free chain is also twisted following the rail. The transport boxes attached to the free chain are also tilted at the same time, and the paper sheets reach an end surfaces on the side at which the transport boxes are lowered and are positioned. Since the rail gradually returns to a horizontal state just in front of the collection box, the paper sheets in the transport boxes reach above the predetermined collection boxes based on the sorting information while the positioned state is kept, drop, and are collected into the collection boxes with reliability without an error.

14 Claims, 10 Drawing Sheets

29
GUIDE RAIL

TRANSPORT MECHANISM OF SORTING MACHINE FOR LARGE THIN OBJECTS

BACKGROUND OF THE INVENTION

1. Field of the Invention

The present invention relates to a transport mechanism of a sorting machine for large thin paper sheets which sorts and collects large thin paper sheets such as postal matter and, more particularly, to a transport mechanism capable of surely collecting the transported objects.

2. Description of the Related Prior Art

In a sorting machine for large thin objects, which drops transported objects stored in a transport box above collection boxes into which they are to be sorted to collect them, for example, a sorting machine for large postal matter, the maximum size of the transported object and the size of the collection box differ depending on the users, but the transport box is formed to be sufficiently large with respect to transported objects in consideration of general versatility. Accordingly, if the size of the collection box is not smaller than the transport box, it is possible to hold the transported objects, which are stored in the transport boxes, in the collection boxes easily if they are dropped in predetermined timing, by positioning the collection boxes with respect to the transport boxes. However, conventionally, the size of the collection box is made a little larger than the maximum size of the transported object in order to enhance installation space efficiency of the sorting machine for large thin objects, and positioning of the transported objects in the transport boxes is not fixed in many cases. Accordingly, the transported objects which are dropped collide against edges of the collection boxes and they are not necessarily held in the collection box with reliability only by positioning the collection boxes with respect to the transport boxes, and thus there arises the problem that collection errors occur and stop of the operation and the like are caused.

If such a collection error occurs, the transported objects are not loaded into the collection boxes in the order in which they are to be collected. This becomes a serious problem when importance is placed on the order of loading, for example, when they are arranged in the order of delivery.

SUMMARY OF THE INVENTION

The present invention is made in view of the above-described problems, and consequently, the object of the present invention is to solve the above-described problems of the prior art and provide a transport mechanism of a sorting machine for large thin objects, which makes it possible to collect objects to be transported into smaller collection boxes than transport boxes with reliability by positioning the objects to be transported stored in the transport boxes inside the transport boxes.

A transport mechanism of a sorting machine for large thin objects of the present invention includes supply means which supplies large thin paper sheets given sorting information at least one by one, transport boxes which store and transport the paper sheets from the supply means at least one by one, collection boxes which collect predetermined paper sheets from the transport boxes based on the sorting information, a transporting rail placed between the supply means and the collection boxes, slide means which is attached to the rail to be relatively movable and moves at least from the supply means to the collection box while supporting the transport box, drive means which moves the slide means, and means which drops the aforementioned paper sheets stored in the aforementioned transport boxes into the aforementioned collection boxes, in a place directly above the aforementioned collection boxes, and the rail is twisted around a center line by predetermined length to tilt the slide means and the transport boxes, which move following this rail, correspondingly to the twist.

It is preferable that the large thin paper sheets are postal matter, and the slide means is a free chain.

It is preferable that the rail is twisted so that it is twisted at a region away from a position facing the collection boxes by a predetermined distance to an upstream side and return to a horizontal state just in front of the collection boxes.

Further, the twist of the rail is sharply applied in a short distance at the beginning and when it returns to the horizontal state, twist is gradually returned in a sufficient distance.

It is preferable that the collection boxes are provided with positioning means which position the collection boxes with the transport boxes to be transported, and the size of the collection box is a little larger as compared with the maximum size of the paper sheets to be collected.

Another transport mechanism of a sorting machine for large thin objects of the present invention includes supply means which supplies large thin paper sheets given sorting information at least one by one, transport boxes which store and transport the paper sheets from the supply means at least one by one, collection boxes which collect the predetermined paper sheets from the transport boxes based on the sorting information, a transporting rail placed between the supply means and the collection boxes, slide means which is attached to the transporting rail to be relatively movable and moves at least from the supply means to the collection box while supporting the transport box, drive means which moves the slide means, means which drops the paper sheets stored in the transport boxes into the collection boxes, in a place directly above the aforementioned collection boxes, a guide member which is placed along the transporting rail and twisted by predetermined length, guide rollers which are attached to outer surfaces of the transport boxes and slide to engage in the guide member, and rotating means which rotatably supports the transport boxes with respect to the slide means, and the transport boxes, which move following the transporting rail and the guide member, are tilted according to the twist of the guide member.

It is preferable that the large thin paper sheets are postal matter, and the slide means is a free chain.

It is preferable that the guide member are twisted so that it is twisted at a region away from a position facing the collection boxes by a predetermined distance to an upstream side and return to a horizontal state just in front of the collection boxes, and the twist of the guide member is sharply applied in a short distance at the beginning and when it returns to the horizontal state, twist is gradually returned in a sufficient distance.

It is preferable that the collection boxes are provided with positioning means which position the collection boxes with the transport boxes to be transported, the size of the collection box is a little larger as compared with the maximum size of the paper sheets to be collected.

According to the transport mechanism of the present invention as described above, the transport boxes under transporting movement are tilted, whereby the objects to be transported stored in the transport boxes can be positioned at a fixed position inside the transport boxes, and the objects to be transported can be collected into the smaller collection boxes than the transport boxes with reliability.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
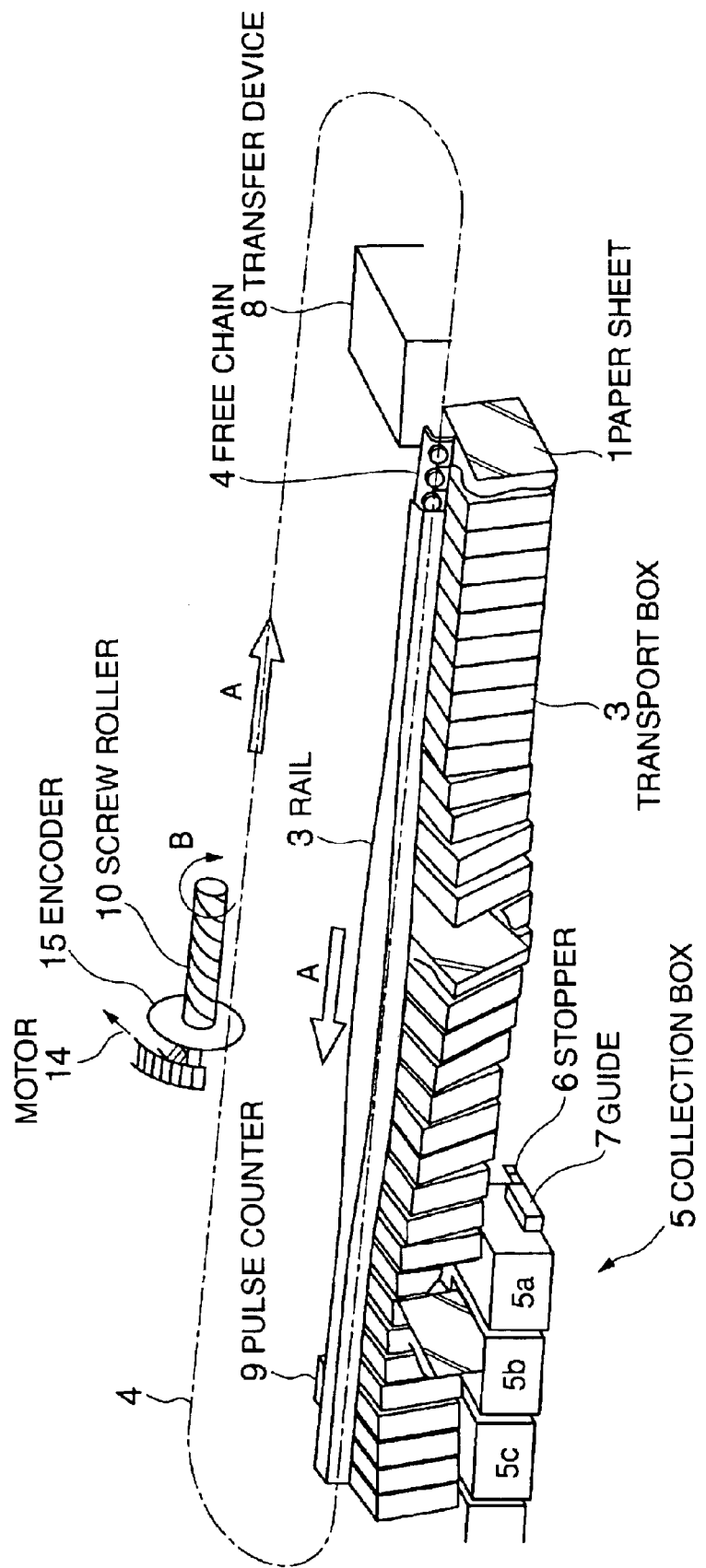
FIG. 1 is a sectional view showing an entire construction of a transport mechanism of the present invention.

With reference to FIG. 1, a transport mechanism of an embodiment of the present invention is constructed to have a plurality of transport boxes 2 each of which stores and transports one large thin paper sheet 1 that is given sorting information and is an object to be transferred, a transporting rail 3 which guides transport movement of the transport boxes 2, a free chain 4 which is always driven by a drive mechanism (see FIG. 6) as will be described later and slides on the rail 3 while supporting the transport boxes 2, a plurality of collection boxes 5 which collect the transported paper sheets 1, a stopper 6 which positions a direction perpendicular to a transfer direction of the collection box 5 so as to be in alignment with the transport boxes 2 to be transported, a guide 7 which restricts the position of the collection box 5 in the transfer direction, a transfer device 8 which supplies and transfers the paper sheets 1 to the transport boxes 2, and a pulse counter 9 which measures a transport distance of the transport boxes 2.

The free chain 4 is in a ring shape without an end (endless loop shape), and performs sliding movement freely on the rail 3.

As the large thin paper sheets 1 which are given the sorting information, it is preferable to assume that they are postal matter.

Figure 2:
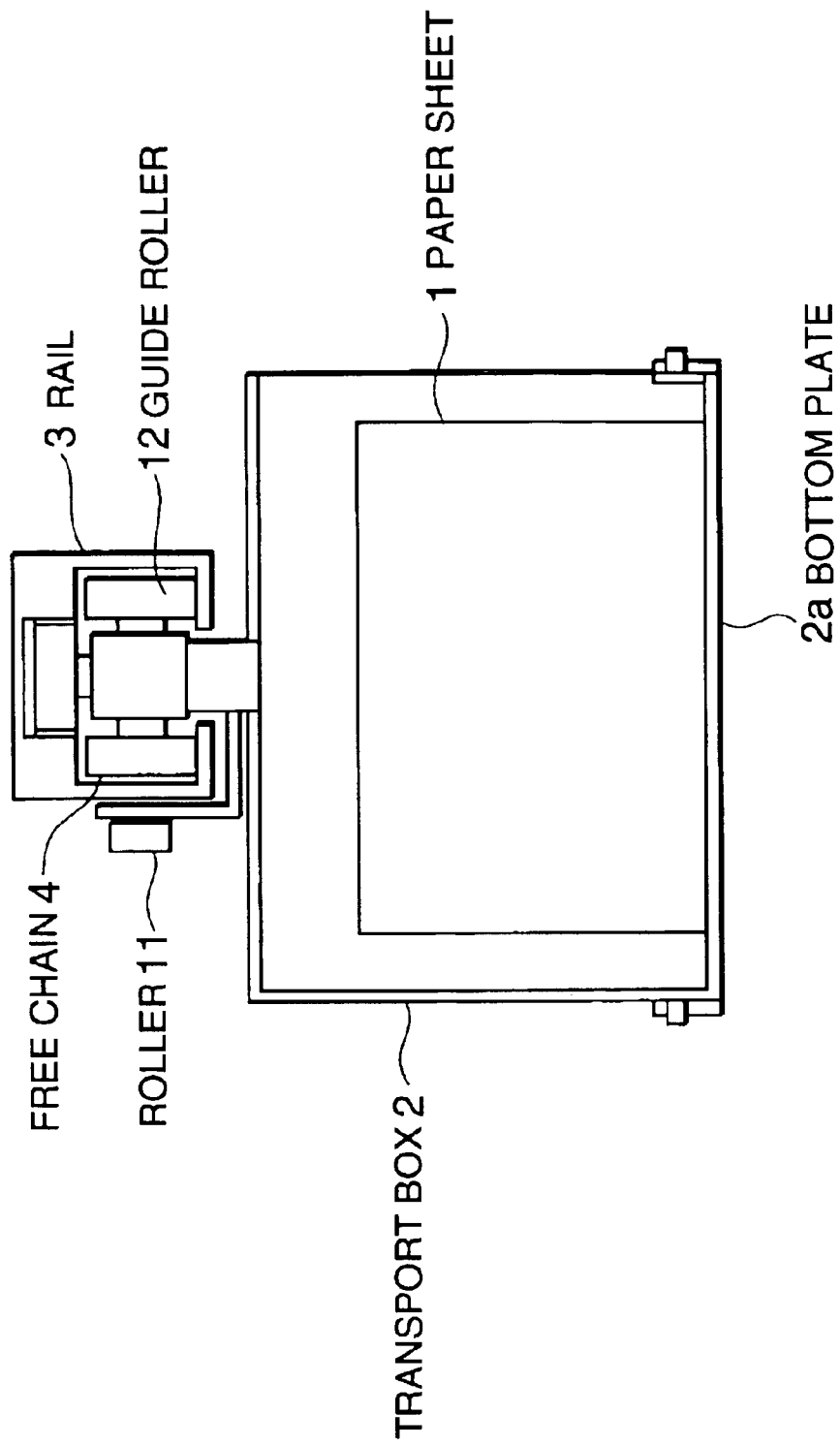
FIG. 2 is a sectional view showing a state before a transport box is tilted in a first embodiment of the present invention.

Mechanical relationship between the free chain 4, the transport boxes 2, and the transporting rail 3 is as shown in FIG. 2. The free chain 4 supports the transport boxes 2 and travels on the rail 3 by rotation of a guide roller 12. The rail 3 has a structure to hold the guide roller 12 therein. The free chain 4 has a guide 13. The guide 13 is guided by a groove 14 of the rail 3, and prevents the transport boxes 2 from rolling during traveling on the rail.

The transport box 2 has an opening on a right side face, and the paper sheets are supplied to the transport box through this opening by the transfer device 8. An openable and closable bottom plate 2a is provided on an underside face of the transport box 2 to drop a predetermined paper sheet 1 to the collection box 5 into which it is sorted and collected.

The rail 3 is twisted around a center line over a range of a predetermined length. With reference to FIG. 1, a state of the twist in the rail 3 will be specifically explained. Twisting is applied so that the rail 3 is twisted from a region away from the position of the first collection box 5a to an upstream side by a predetermined distance, and returned to a horizontal state again immediately in front of the first collection box 5a. As for twisting, an outer circumference side is twisted in a lowering direction and an inner circumference side is in a rising direction at an angle of about 20 to 25 degrees relative to the transporting route of the free chain 4 in an endless loop shape.

It is preferable that twist is abruptly applied in a short distance from the horizontal state at the beginning of the twist and when it is returned to the horizontal state, twist is gradually returned in a sufficient distance.

As for the collection boxes 5, a plurality of collection boxes 5a, 5b, 5c, . . . are placed to continue under the transport boxes 2 to collect the predetermined paper sheets 1 based on the sorting information given to the transported paper sheets 1.

Figure 5:
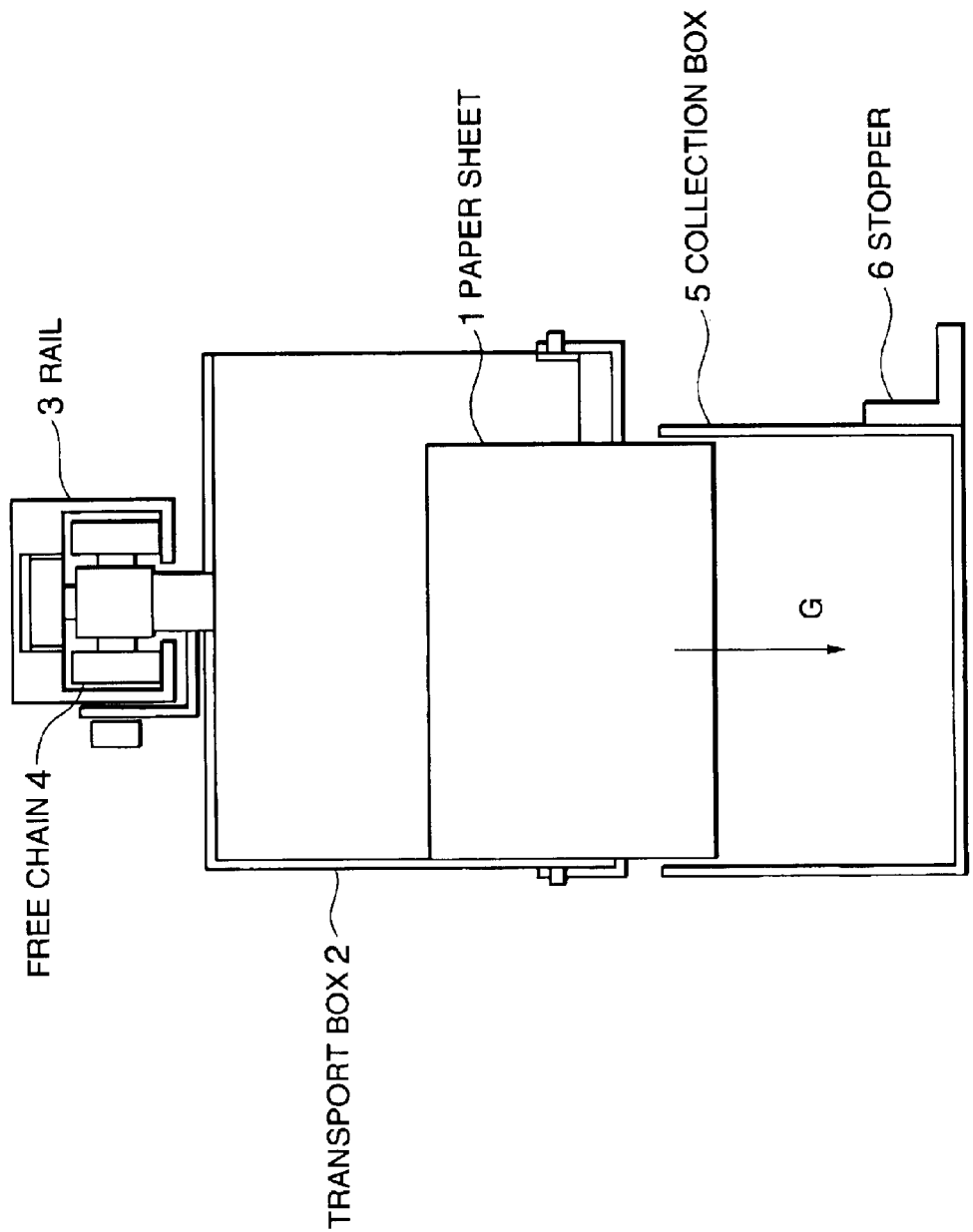
FIG. 5 is a sectional view showing positional relationship between the transport box and a collection box in the first embodiment of the present invention.

Referring to FIG. 5, the relationship between the paper sheet 1, the transport box 2 and the collection box 5 is shown. In consideration of general versatility, the size of the transport box 2 is sufficiently large with respect to the size of the paper sheet 1. Meanwhile, the size of the collection box 5 is only a little larger than the maximum size of the paper sheet 1 for the purpose of enhancing the efficiency of the space at the time of transport. Accordingly, the stopper 6, which performs positioning in a direction perpendicular to the transport direction of the collection box 5, is provided to determine the positional relationship between the collection box 5 which is of a size a little larger than the size of the paper sheet 1 and the transport box 2. As shown in FIG. 1, a guide 7, which restricts the position corresponding to the transport direction of the collection box 5, is provided.

Figure 6:
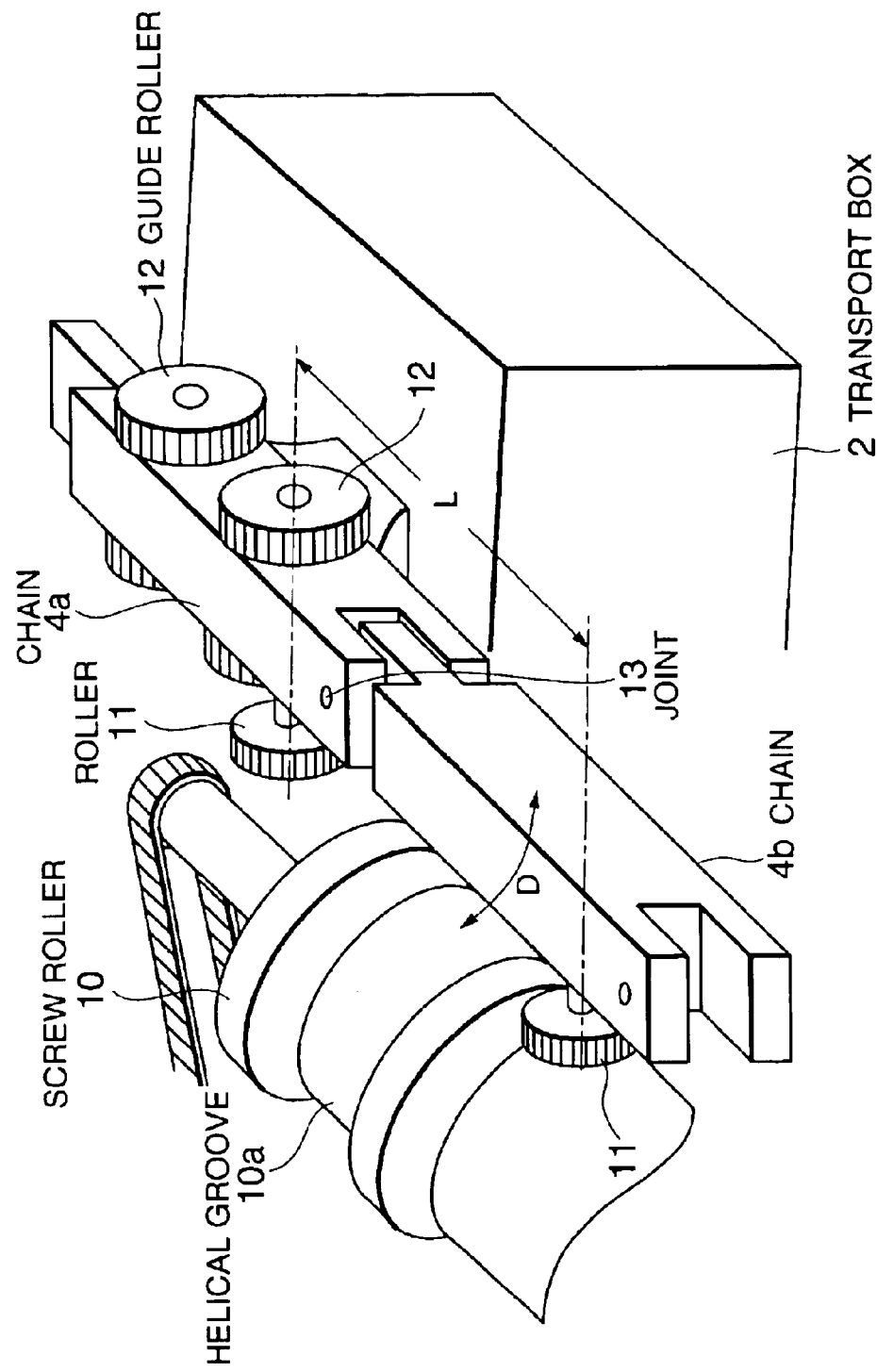
FIG. 6 is a perspective view showing a mechanism for driving the transport box, which is included in the transport mechanism of the present invention.

Referring to FIG. 6, a drive mechanism of the free chain 4 will be explained.

The free chain 4 is formed in an endless loop shape with an infinite number of chains 4a, 4b, 4c, . . . each supporting one of the transport boxes 2 being connected by a joint part 13. Each chain is connected by the joint part 13 so as to be freely moved reciprocally in a rotating direction (arrow C) and a lateral direction (arrow D). Each of the chains 4a, 4b, 4c, . . . has a roller 11 and two pairs of guide rollers 12, and the roller 11 is fitted into a screw roller 10 that will be described later to receive a driving force. Meanwhile, the two pairs of guide rollers 12 slide in a concave groove of the rail 3 as described above to be guided (see FIG. 2).

The screw roller 10 is in the vicinity of a part of the endless loop shape part of the free chain 4, and is rotated in the direction of the arrow B by a driving force from a motor 14 not shown, as shown in FIG. 1. The roller 11 of the chain 4a shown in FIG. 6 is fitted into a helical groove 10a which the screw roller 10 has, and the free chain 4 is slidingly driven in the direction of the arrow A via the roller 11 by the rotation of the screw roller 10 in the direction of the arrow B. An encoder 15 is attached to the screw roller 10, and it produces encoder pulse according to the rotation of the screw roller 10, and the pulse is measured with a pulse counter 9.

It is suitable that the length of the screw roller 10 is a little longer than a distance L between the rollers 11 on the respective chains 4a, 4b, 4c, . . . , and before the roller 11 of a certain chain is removed from the helical groove of the screw roller 10, the roller 11 of the next chain is fitted into the helical groove of the screw roller 10, whereby the free chain 4 in an endless loop shape is slidingly driven continuously in the direction of the arrow A.

Next, an operation of the first embodiment with the above construction will be explained.

First, the operation will be described in short. As shown in FIG. 1 to FIG. 5, the transport box 2 which transports the paper sheet 1 is attached to the free chain 4 which is always driven by being supported by the rail 3. When reaching the portion of the rail 3 at which twist is applied, the free chain 4 is also twisted following the rail 3. The transport box 2 attached to the free chain 4 is also tilted at the same time and the paper sheet 1 reaches an end surface of the one side of the transport box 2 and is positioned by inertia and self weight. The rail 3 gradually returns to the horizontal state just in front of the collection box 5, and therefore the paper sheet 1 inside the transport box 2 reaches an area above the collection box 5 while they are kept in the positioned state. Above the predetermined collection box 5, the bottom plate of the transport box is opened, and the paper sheet drops and is collected in the collection box correctly.

The operation will be explained in detail below. As shown in FIG. 1, a plurality of transport boxes 2 are supported by the endless loop shaped free chains 4 as described above, and are slidingly driven in the direction of the arrow A via the roller 11 by the rotation of the screw roller 10 in the direction of the arrow B by the driving force of the motor 14. One paper sheet is transferred and stored into each of the transport boxes 2, which is moved in the direction of the arrow A, from the transfer device 8 through the side surface opening. The paper sheet 1 is given the sorting information by a reading device, key entry, or the like, and the predetermined collection box 5 in which it is collected is designated. The transferred paper sheet 1 is placed at an optional position inside the transport box 2 as shown in FIG. 2.

Figure 3:
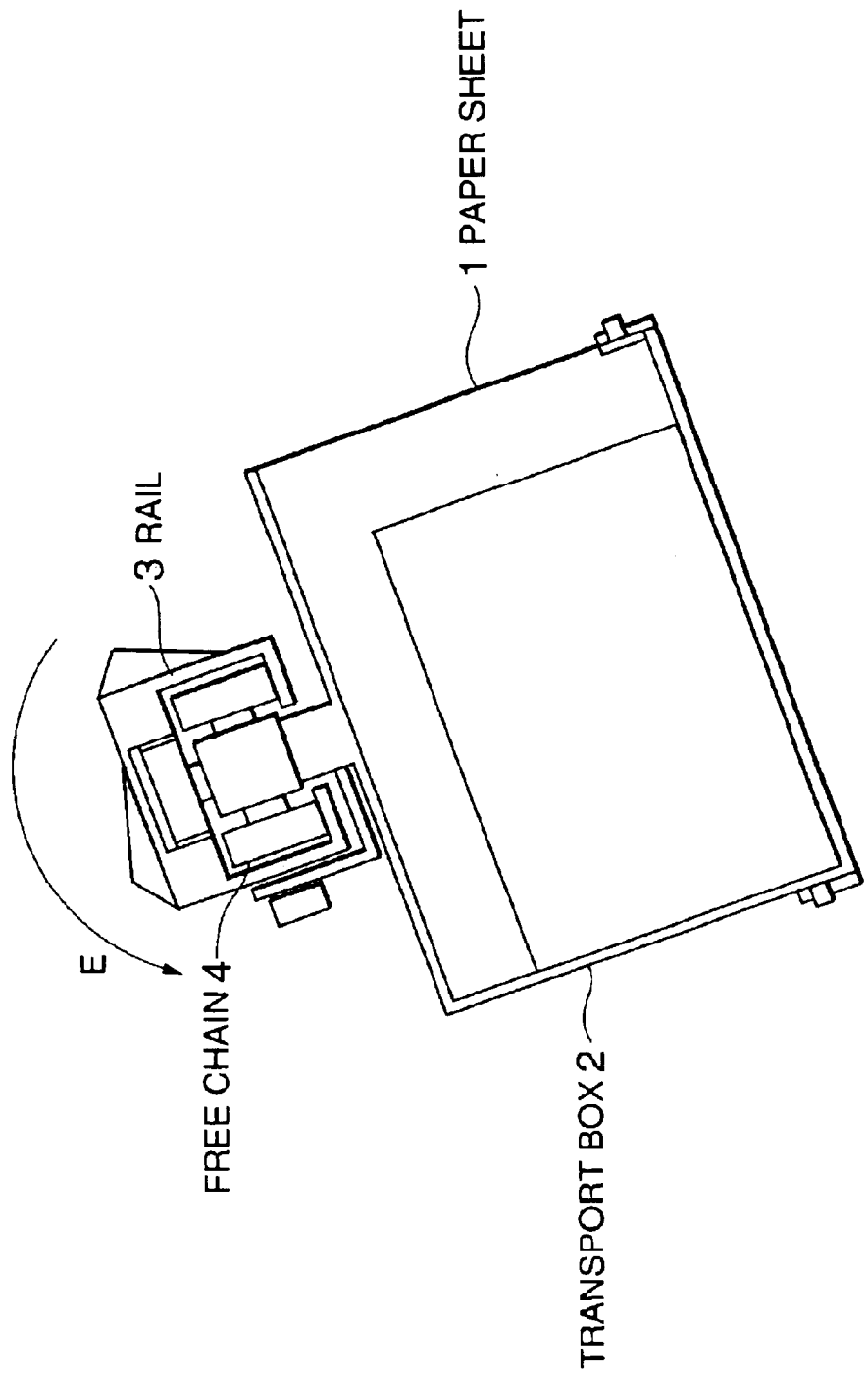
FIG. 3 is a sectional view showing a state in which the transport box is being tilted in the first embodiment of the present invention.

When each of the chains 4a, 4b, . . . of the free chain 4 supporting the transport box 2 approaches the spot at which the rail 3 is twisted, the chains 4a, 4b, . . . are twisted in a direction of the arrow E from the horizontal state following the twist of the rail 3 by free movement of the joint part 13 in the rotating direction and the lateral direction, as shown in FIG. 3. In this case, twisting is performed abruptly in a short distance. At the same time, the respective boxes 2 which are attached to the chains 4a, 4b, . . . perform tilting movement in the direction of the arrow E. The stored paper sheet 1 moves to the end surface on the side at which the transport box 2 is tilted downward by inertia and self weight as a result that the transport box 2 is tilted, and the paper sheet 1 is positioned with respect to the transport box 2.

Figure 4:
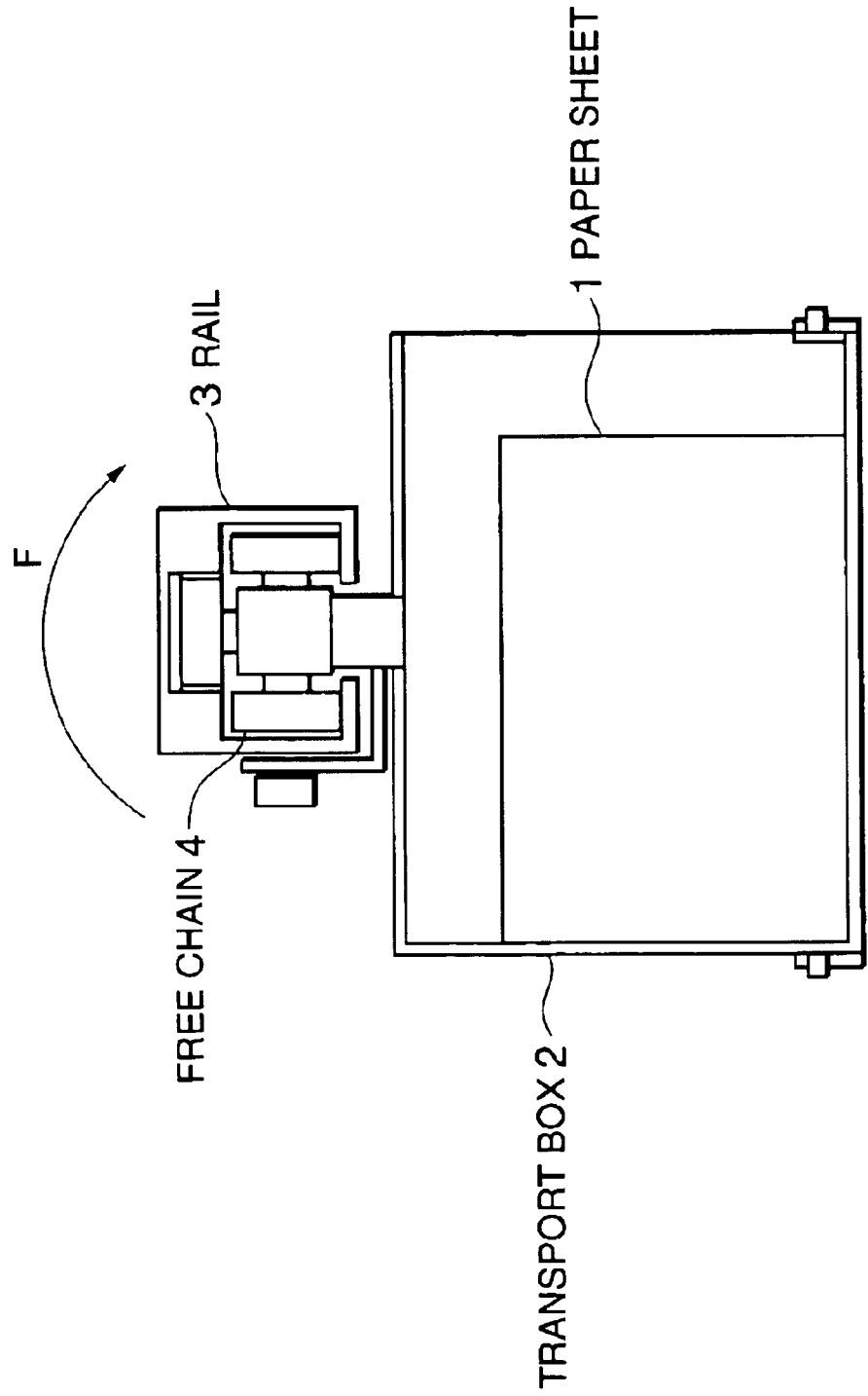
FIG. 4 is a sectional view showing a state in which the transport box finishes being tilted in the first embodiment of the present invention.

In this state, the free chain 4 and the transport box 2 slide to move in the direction of the arrow A, and following the twist of the rail 3 returning to its original state as it approaches the collection box 5, the transport box 2 returns to the original horizontal state as the arrow F shown in FIG. 4. Since twist of the rail 3 is applied so as to return to the horizontal state gradually in a sufficient distance in this case, the position of the paper sheet 1, which is positioned at the end surface inside the transport box 2, is invariable, and the positioned state is kept.

The amount of transporting movement of each of the transport boxes 2 is measured by the pulse counter 9 according to the encoder pulse which the encoder 15 outputs with a point of time at which the paper sheet 1 is transferred from the transfer device 8 as trigger. As a result of the measurement, when it is determined that the transport box 2 reaches the collection box 5 based on the sorting information of the paper sheet 1 stored in the transport box 2, the bottom plate 2a of the transport box 2 is opened, and the paper sheet 1 drops toward the predetermined collection box 5 of the collection boxes 5a, 5b, . . . .

As described above, the paper sheet 1 is positioned at the end surface in the transport box 2 during transporting movement on the twisted rail 3, and the collection box 5 is positioned with respect to the transport box 2 by the stopper 6 as shown in FIG. 5, and therefore even if the paper sheet 1 is in substantially the same size as the collection box 5, it does not collide against the edge of the collection box 5, and is surely collected as shown by the arrow G without an error.

Next, a second embodiment of the present invention will be explained.

Figure 7:
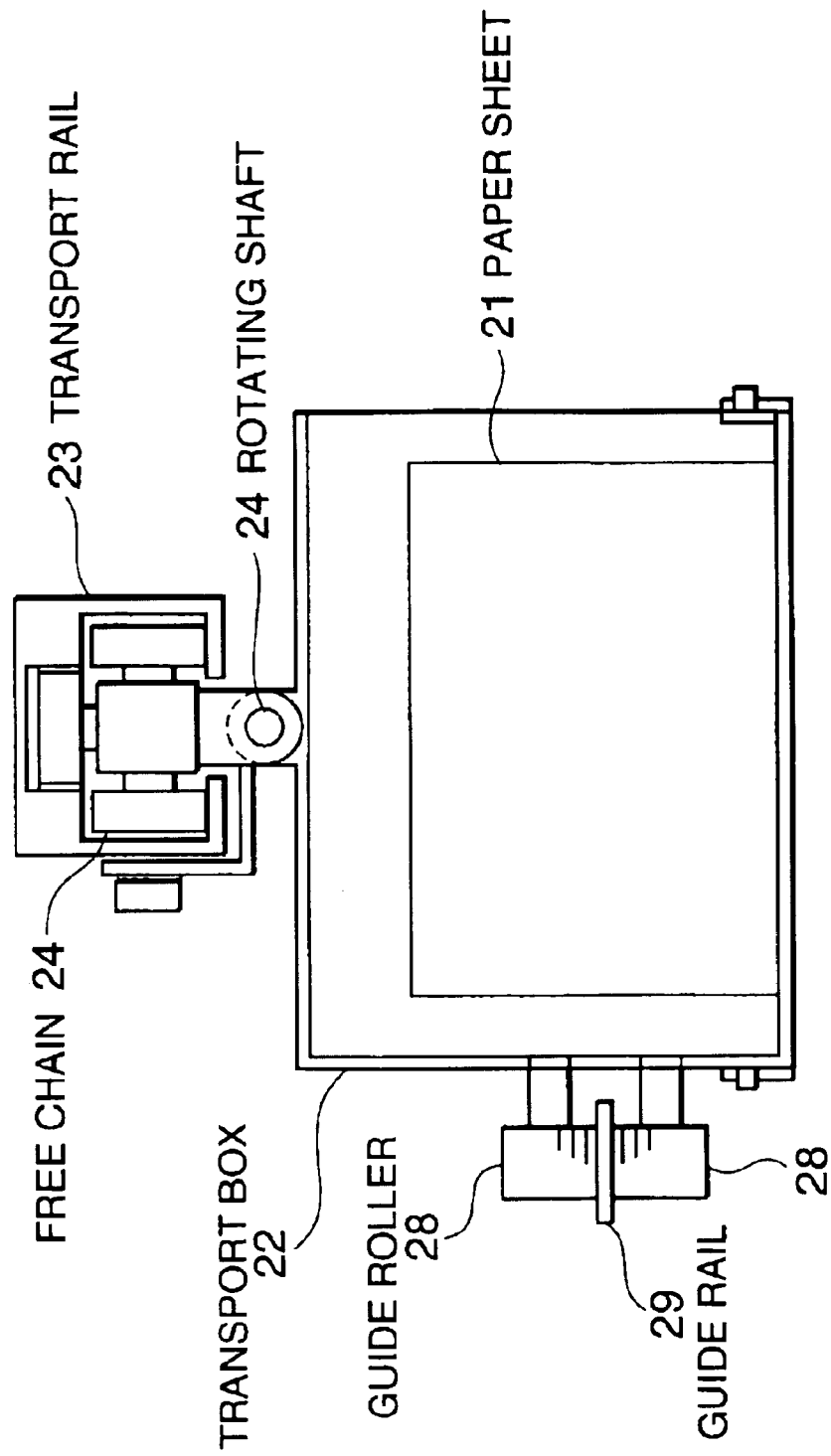
FIG. 7 is a sectional view showing a state before the transport box is tilted in a second embodiment of the present invention.
Figure 8:
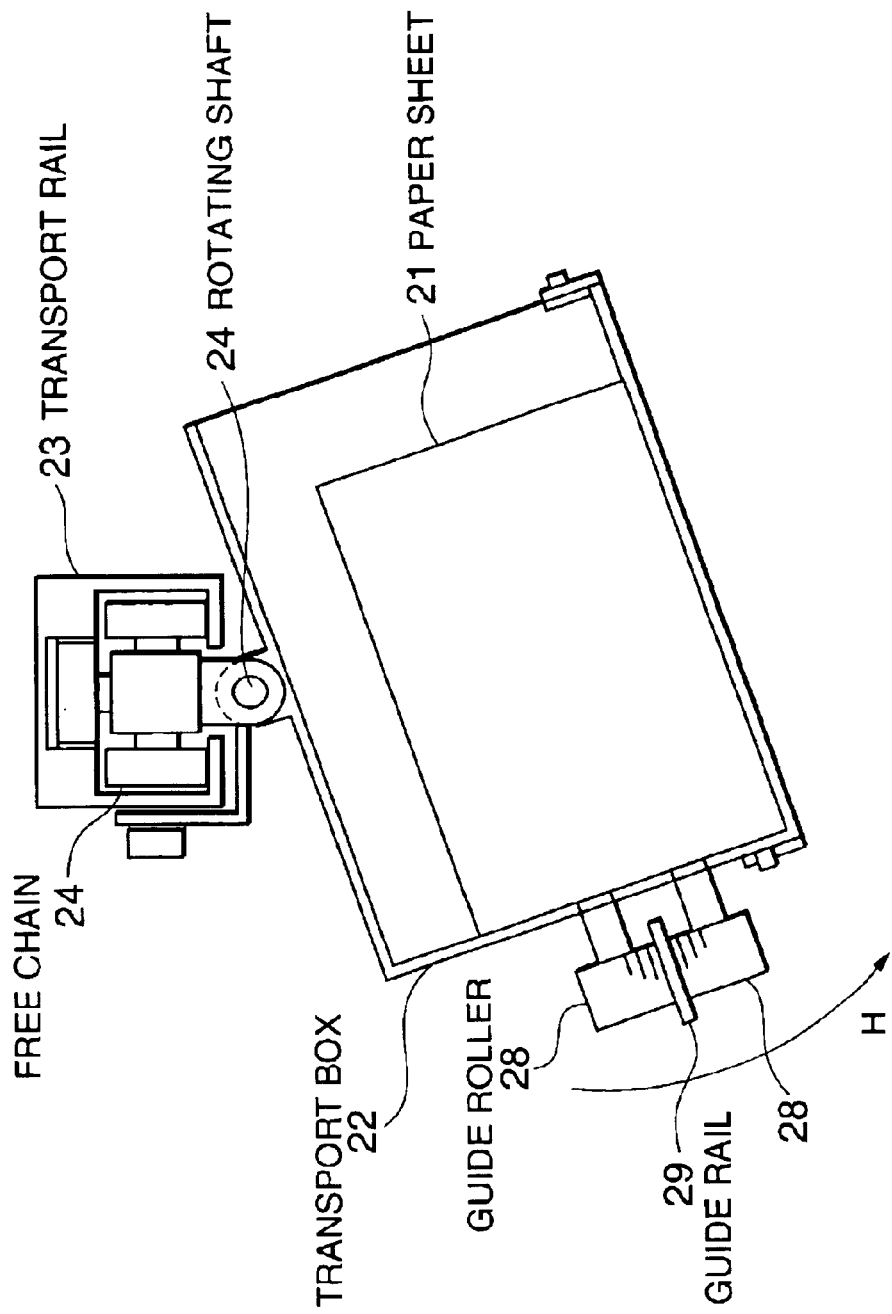
FIG. 8 is a sectional view showing a state in which the transport box is being tilted in the second embodiment of the present invention.
Figure 9:
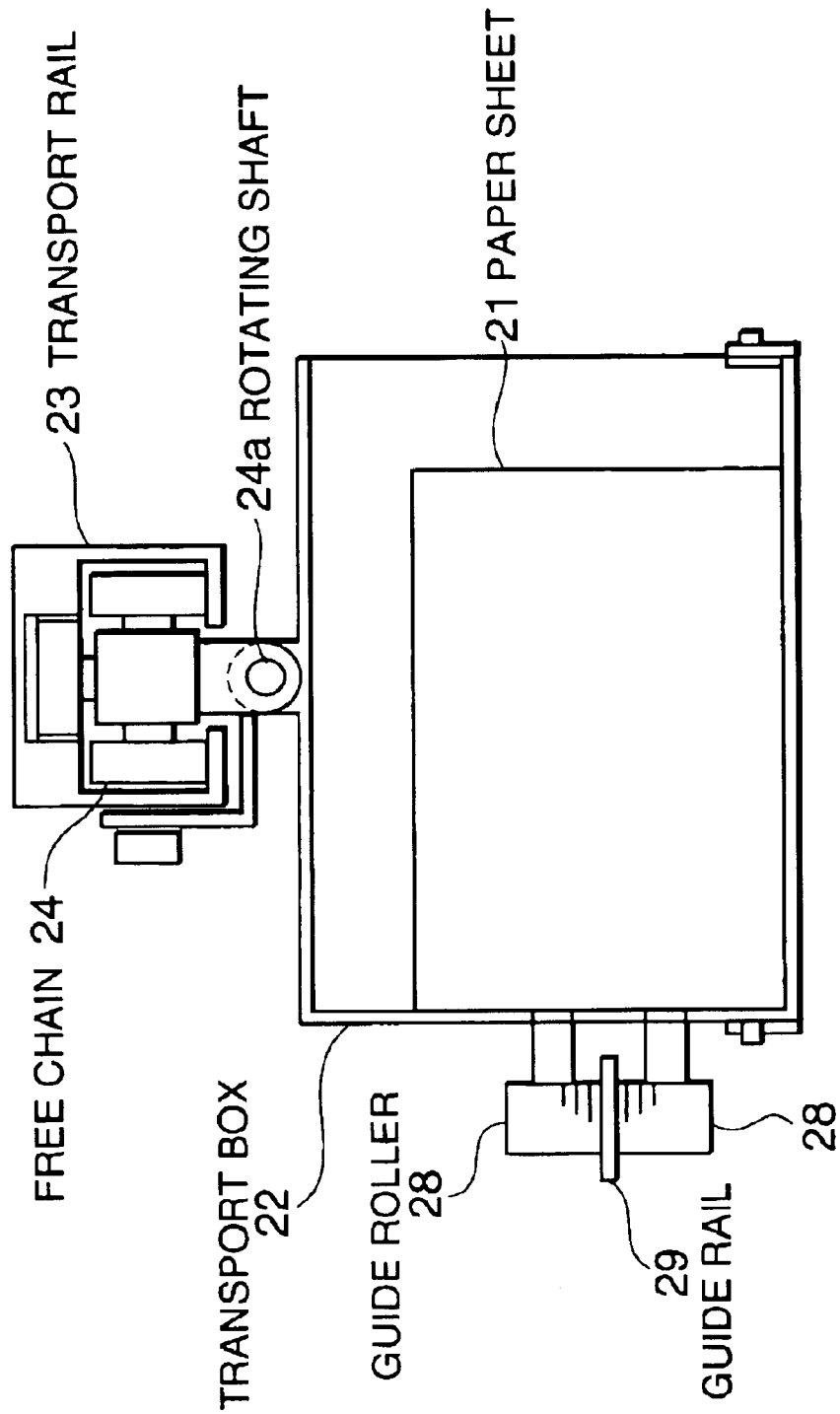
FIG. 9 is a sectional view showing a state in which the transport box finishes being tilted in the second embodiment of the present invention.

FIG. 7 through FIG. 9 are cross sectional views showing the operation state of the transport box in the second embodiment. In the second embodiment, an entire construction of the transport mechanism is substantially the same as the construction of the first embodiment shown in FIG. 1. The construction differing from the first embodiment is a transport rail 23, a rotating shaft 24a, a guide roller 28 and a guide rail 29 as shown in FIG. 7. Upper and lower guide rollers 28 sandwich a guide rail 29.

Referring to FIG. 7, the second embodiment has a plurality of large thin paper sheets 21 which are given sorting information and are objects to be transported (corresponding to the paper sheet 1 in the first embodiment, ditto for hereinafter), a plurality of transport boxes 22 (corresponding to the transport box 2 in the first embodiment) each storing and transporting the paper sheet 21 one by one, the transport rail 23 which guides transporting movement of the transport boxes 22, a free chain 24 (corresponding to the free chain 4 in the first embodiment) which is in an endless loop shape, always driven by a drive mechanism, and attached to the transport rail 23 to be slidingly movable and supports a plurality of transport boxes 22 as slide means, and the other components such as the collection boxes 5, the stopper 6, the guide 7, the transfer device 8, the pulse counter 9, the screw roller 10 as the drive mechanism, the motor 14 and the encoder 15 have exactly the same construction as in the first embodiment shown in FIG. 1.

Figure 10:
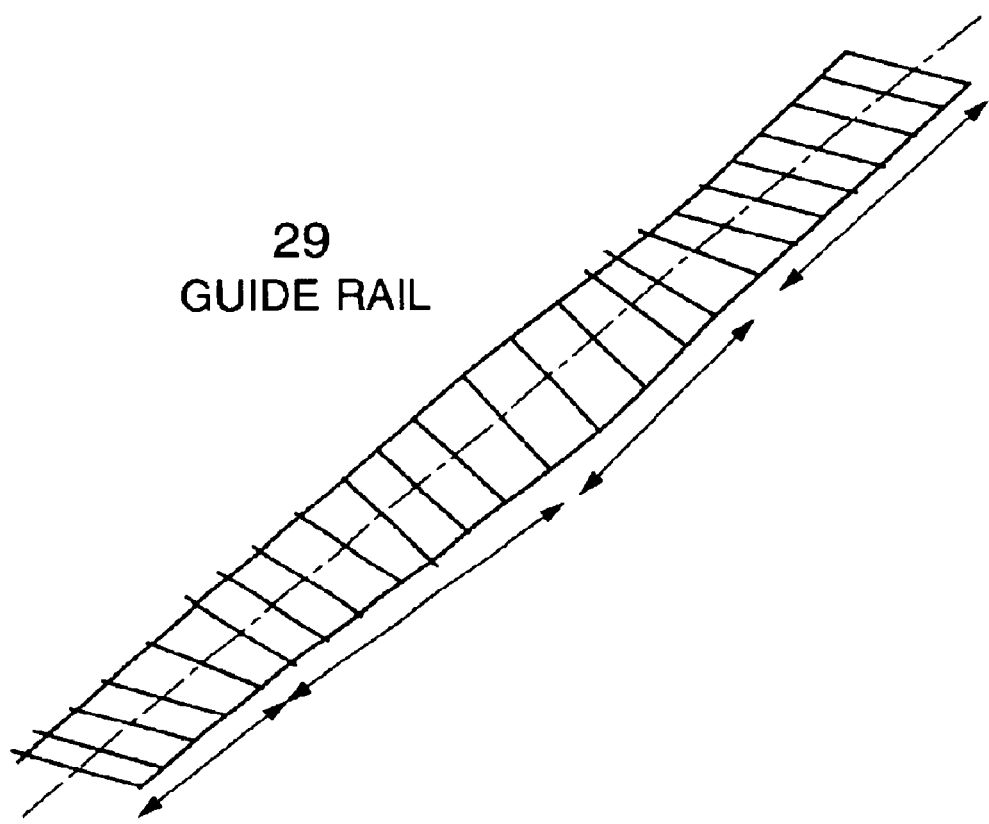
FIG. 10 is a schematic diagram of a structure of twist of a guide rail included in the transport mechanism of the present invention.

The transport rail 23 is placed between the transfer device 8 and the collection box 5, but unlike the rail 3 in the first embodiment, it is not twisted, and it is in a linear shape in the transport direction and is a simple slide rail. The guide rail 29 as a guide member which is twisted in predetermined length is placed along the transport rail 23. The twist portion of the guide rail 29 is schematically illustrated in FIG. 10. The twist of the guide rail 29 is sharply applied at the beginning of the twist at an upstream side of the collection box 5, and the guide rail 29 returns to the horizontal state just in front of the collection box 5 with a sufficient distance.

The guide roller 28, which slides to engage in the twisted guide rail 29, is provided on the outer surface of the transport box 22, and the rotating shaft 24a is provided at the upper part of the transport box 22 to be rotatably supported by the free chain 24.

The relationship between the sizes of the paper sheet 21, the transport box 22 and the collection box 5 is the same relationship as described in the first embodiment, and the size of the collection box 5 is a little larger than the maximum size of the paper sheets 21.

An operation of the second embodiment with the above construction will be explained.

When the paper sheet 21 is stored in the transport box 22 from the transfer device 8, the paper sheet 21 is placed at an optional position inside the transport box 22, as shown in FIG. 7. The free chain 24 slides to move in the direction of the arrow A in FIG. 1 by the transport rail 23 by drive of the driving mechanism, and when the transport box 22 reaches the twisted portion of the guide rail 29, the transport box 22 is tilted in a direction of the arrow H with the rotating shaft 24a as a fulcrum via the guide roller 28 and by the rotation of the rotating shaft 24a. As a result that the transport box 22 is tilted, the paper sheet 21 inside is moved to the end surface on the lowered side of the transport box 22, and positioned in the transport box 22.

In this state, as the transport box 22 sliding to move in the direction of the arrow A comes closer to the collection box 5, and the twist of the guide rail 29 gradually returns to the original state, the transport box 22 returns to the original horizontal state as shown in FIG. 9. In this situation, the position of the paper sheet 21 inside the transport box 22 is unchangeable. The paper sheet 21 dropped and collected in the collection box 5 thereafter, and determination of the predetermined collection box 5 based on the sorting information of the paper sheet 21 by the pulse counter 9 are the same as in the aforementioned first embodiment.

Accordingly, in the second embodiment, the paper sheet 21 is also surely collected without hitting the edge of the collection box 5 without an error even if the paper sheet 21 is in substantially the same size as the collection box 5.

In the aforementioned first and second embodiments, the large thin paper sheets 1 and 21 are assumed to be postal matter, but this is not restrictive, and the present invention may be applied to various kinds of letters, documents, sheets and so on which are given the sorting information.

As explained thus far, according to the transport mechanism of the sorting machine for large thin objects of the present invention, the transported object stored in the transport box can be positioned at the fixed position inside the transport box by tilting the transport box during transport movement with the transporting rail being twisted, and therefore even when the sizes of the transport objects and the collection boxes differ depending on the users, the transported objects can be collected with a large transport box in consideration of general versatility without conforming the size of the transport box to the collection box, thus obtaining the first effect of making it possible to collect them with reliability without an error.

The second effect is that the transported objects given the sorting information can be laid in the collected order in the collection box, because the transported objects are collected with reliability without an error in the state in which they are positioned inside the transport boxes. This is especially effective in the operation function of arranging objects in the order of delivery, in which importance is placed on the order of loading.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A transport mechanism of a sorting machine for large thin objects, comprising:

supply means which supplies large thin paper sheets given sorting information at least one by one;

transport boxes which store said paper sheets from said supply means at least one by one;

collection boxes which collect predetermined paper sheets from said transport boxes based on said sorting information;

a transporting rail placed between said supply means and said collection boxes;

slide means which is attached to said rail to be relatively movable and moves at least from said supply means to said collection box while supporting said transport box;

drive means which moves said slide means; and means which drops said paper sheets stored in said transport boxes into said collection boxes, in a place directly above said collection boxes, wherein said rail is twisted around a center line by predetermined length to tilt said slide means and said transport boxes, which move according to this rail, correspondingly to said twist.

2. The transport mechanism of the sorting machine for the large thin objects sheets according to claim 1, wherein said large thin paper sheets are postal matter.

3. The transport mechanism of the sorting machine for the large thin objects according to claim 1, wherein said slide means is a free chain.

4. The transport mechanism of the sorting machine for the large thin objects according to claim 1, wherein said rail is twisted so that it is twisted at a region away from a position facing said collection boxes by a predetermined distance to an upstream side and return to a horizontal state just before said collection boxes.

5. The transport mechanism of the sorting machine for the large thin objects according to claim 1, wherein the twist of said rail is sharply applied in a short distance at the beginning and when it returns to the horizontal state, twist is gradually returned in a sufficient distance.

6. The transport mechanism of the sorting machine for the large thin objects according to claim 1, wherein said collection boxes are provided with positioning means which position said collection boxes with said transport boxes to be transported.

7. The transport mechanism of the sorting machine for the large thin objects according to claim 1, wherein the size of said collection box is a little larger as compared with the maximum size of said paper sheets to be collected.

8. A transport mechanism of a sorting machine for large thin objects, comprising:

supply means which supplies large thin paper sheets given sorting information at least one by one;

transport boxes which store and transport said paper sheets from said supply means at least one by one;

collection boxes which collect the predetermined paper sheets from said transport boxes based on said sorting information;

a transporting rail placed between said supply means and said collection boxes;

slide means which is attached to said transporting rail to be relatively movable and moves at least from said supply means to said collection box while supporting said transport box;

drive means which moves said slide means;

means which drops said paper sheets stored in said transport boxes into said collection boxes, in a place directly above said collection boxes;

a guide member which is placed along said transporting rail and twisted by predetermined length;

guide rollers which are attached to outer surfaces of said transport boxes and slide to engage in said guide member, and rotating means which rotatably supports said transport boxes with respect to said slide means, wherein said transport boxes, which move following said transporting rail and said guide member, are tilted according to the twist of said guide member.

9. The transport mechanism of the sorting machine for the large thin objects according to claim 8, wherein said large thin paper sheets are postal matter.

10. The transport mechanism of the sorting machine for the large thin objects according to claim 8, wherein said slide means is a free chain.

11. The transport mechanism of the sorting machine for the large thin objects according to claim 8, wherein guide member is twisted so that it is twisted at a region away from a position facing said collection boxes by a predetermined distance to an upstream side and return to a horizontal state just in front of said collection boxes.

12. The transport mechanism of the sorting machine for the large thin objects according to claim 8, wherein the twist of said guide member is sharply applied in a short distance at the beginning and when it returns to the horizontal state, twist is gradually returned in a sufficient distance.

13. The transport mechanism of the sorting machine for the large thin objects according to claim 8, wherein said collection boxes are provided with positioning means which position said collection boxes with said transport boxes to be transported.

14. The transport mechanism of the sorting machine for the large thin objects according to claim 8, wherein the size of said collection box is a little larger as compared with the maximum size of said paper sheets to be collected.

* * * * *